US010230318B2

(12) United States Patent
Yoo et al.

(10) Patent No.: US 10,230,318 B2
(45) Date of Patent: Mar. 12, 2019

(54) METHOD FOR ESTIMATING PARAMETER OF INDUCTION MACHINES

(71) Applicants: LSIS CO., LTD., Gyeonggi-do (KR); MYONGJI UNIVERSITY INDUSTRY AND ACADEMIA COOPERATION FOUNDATION, Gyeonggi-do (KR)

(72) Inventors: Anno Yoo, Gyeonggi-do (KR); Yong-Doo Yoon, Seoul (KR)

(73) Assignee: LSIS CO., LTD., Anyang-si, Gyeonggi-Do (KR)

(*) Notice: Subject to any disclaimer, the term of this patent is extended or adjusted under 35 U.S.C. 154(b) by 53 days.

(21) Appl. No.: 15/264,506

(22) Filed: Sep. 13, 2016

(65) Prior Publication Data
US 2017/0085202 A1    Mar. 23, 2017

(30) Foreign Application Priority Data
Sep. 17, 2015  (KR) .................. 10-2015-0131496

(51) Int. Cl.
H02P 23/14    (2006.01)
H02P 21/14    (2016.01)

(52) U.S. Cl.
CPC .............. *H02P 23/14* (2013.01); *H02P 21/14* (2013.01)

(58) Field of Classification Search
CPC ..................................................... H02P 23/14
See application file for complete search history.

(56) References Cited

U.S. PATENT DOCUMENTS

| 5,689,169 A | 11/1997 | Kerkman et al. |
| 8,483,981 B2 | 7/2013 | Heikkila |
| 2002/0158658 A1 | 10/2002 | Godbersen |
| 2005/0071095 A1 | 3/2005 | El-Ibiary |
| 2006/0273755 A1* | 12/2006 | Heikkila ................ G01R 31/34 318/812 |
| 2009/0051308 A1* | 2/2009 | Lu ........................ G01R 31/343 318/490 |

(Continued)

FOREIGN PATENT DOCUMENTS

| CN | 101944877 A | 1/2011 |
| CN | 101944878 A | 1/2011 |

(Continued)

OTHER PUBLICATIONS

Lee, Wook-Jin, Yoon, Young-Doo, Sul, Seung-Ki, Choi, Yoon-Young, Shim, Young-Seok; Title: A Simple Induction Motor Parameter Estimation Method for Vector Control; Publisher: Hyundai Elevator Co.; URL: http://www.hyundaielevator.co.kr.

(Continued)

*Primary Examiner* — John E Breene
*Assistant Examiner* — Jeffrey C Morgan
(74) *Attorney, Agent, or Firm* — K&L Gates LLP (57) ABSTRACT

Disclosed embodiments relate to methods, apparatuses, and systems for estimating parameters of an induction machine. In some embodiments, a method for estimating parameter of an induction machine includes estimating parameters of the induction machine more accurately even when it is stationary by utilizing voltage equations of the induction machine and signal processing techniques, with no additional hardware.

8 Claims, 5 Drawing Sheets

(56) References Cited

U.S. PATENT DOCUMENTS

| | | | |
|---|---|---|---|
| 2011/0001447 A1* | 1/2011 | Heikkila | H02P 21/14 318/490 |
| 2012/0123715 A1* | 5/2012 | Eskola | G01R 31/34 702/65 |
| 2014/0285230 A1 | 9/2014 | Messersmith et al. | |
| 2015/0126881 A1 | 5/2015 | Ogiue et al. | |
| 2015/0128661 A1 | 5/2015 | Jung et al. | |
| 2015/0177328 A1* | 6/2015 | Harke | H02P 23/14 324/654 |

FOREIGN PATENT DOCUMENTS

| | | |
|---|---|---|
| CN | 103208965 A | 7/2013 |
| CN | 103888042 A | 6/2014 |
| EP | 1729141 A1 | 12/2006 |
| EP | 2270523 A1 | 1/2011 |
| JP | H09502334 A | 3/1997 |
| JP | 2009072006 A | 4/2009 |
| JP | 2012249489 A | 12/2012 |
| JP | 2014096977 A | 5/2014 |
| JP | 2014204668 A | 10/2014 |
| KR | 10-1998-0048107 A | 9/1998 |
| KR | 10-2000-0007243 A | 2/2000 |
| KR | 0-2004-0072880 A | 8/2004 |
| KR | 10-2004-0084083 A | 10/2004 |
| KR | 10-2012-0074950 A | 7/2012 |
| KR | 10-1221216 B1 | 1/2013 |

OTHER PUBLICATIONS

Hsu, J. S. et al, "Comparison of Induction Motor Field Efficiency Evaluation Methods", Conference Record of the 1996 IEEE Industry Applications Conference vol. 1, Oct. 6, 1996, pp. 703-712.

European search report dated Jan. 30, 2017 for corresponding EP application 16181391.0.

Japanese office action dated Jul. 4, 2017 corresponding to application No. 2016-181922.

European Office Action for related European Application No. 16181391.0; dated Aug. 22, 2018; (7 pages).

Chinese Office Action for related Chinese Application No. 201610815015.2; dated Oct. 8, 2018; (8 pages).

* cited by examiner

FIG. 1

PRIOR ART

METHOD FOR ESTIMATING PARAMETER OF INDUCTION MACHINES

CROSS REFERENCE TO RELATED APPLICATIONS

This application claims the benefit of Korean Patent Application No. 10-2015-0131496, filed on Sep. 17, 2015, entitled "METHOD FOR ESTIMATING PARAMETER OF INDUCTION MACHINES", which is hereby incorporated by reference in its entirety.

BACKGROUND

Technical Field

Embodiments of the present disclosure relate to methods and systems for estimating parameters of an induction machine and, more specifically to a method for estimating parameter of an induction machine that can estimate parameters of the induction machine more accurately even when it is stationary by utilizing voltage equations of the induction machine and signal processing techniques, with no additional hardware.

Description of the Related Art

An induction machine is widely used in a variety of applications including fans, pumps, cranes, elevators, industrial washing machines, servo motors, etc.

There are many methods for driving an induction machine, such as constant air gap flux (V/f) control, field oriented control (FOC), direct torque control (DTC), etc. In order to improve the driving performance of an induction machine using such methods, it is essential to obtain parameters of the induction machine.

The methods for estimating parameters of an induction machine can be largely divided into rotational estimating fashion that estimates parameters while an induction machine is rotating, and stationary estimating fashion that estimates parameters while an induction machine is stationary.

The rotational estimating fashion cannot often used depending on applications, installation condition of an inverter, or driving manner of an induction machine, the stationary estimating fashion is required increasingly.

Embodiments of the present disclosure relate to a system and method for estimating parameters of an induction machine when it is stationary. More specifically, some embodiments of the present disclosure provide a novel scheme that can estimate parameters of an induction machine, especially a rotor time constant and mutual inductance of the induction machine when it is stationary by utilizing voltage equations of an induction machine and signal processing techniques.

SUMMARY

It is an aspect of some embodiments of the present disclosure to provide a method for estimating parameters of an induction machine that can estimate parameters of the induction machine more accurately even when it is stationary by utilizing voltage equations of the induction machine and signal processing techniques, with no additional hardware.

Objects of some embodiments of the present disclosure are not limited to the above-described objects and other objects and advantages can be appreciated by those skilled in the art from the following descriptions. Further, it will be easily appreciated that the objects and advantages of some embodiments of the present disclosure can be practiced by means recited in the appended claims and a combination thereof.

In accordance with one aspect of some embodiments of the present disclosure, a method for estimating parameters of an induction machine when it is stationary includes: applying a DC current to one direction on a stationary reference frame to obtain a stator voltage from a stator flux and a rotor flux obtained from an electric model of the induction machine when it is stationary; calculating a stator resistance from the obtained stator voltage; calculating a stator transient inductance from the obtained stator voltage; and calculating parameters of the induction machine including a rotor time constant and a magnetizing inductance by using the calculated stator resistance and the calculated stator transient inductance.

The calculating the stator resistance may include calculating the stator resistance by using a slope between two or more current values measured taking into account non-linearity of an inverter, and conduction resistances of a semiconductor switch and a diode.

The calculating the stator transient inductance may include calculating the stator transient inductance from a value obtained by applying the stator voltage in the form of short pulses.

The calculating parameters may include calculating the rotor time constant and the magnetizing inductance by using an integration method. In addition, the calculating parameters may include calculating the magnetizing inductance by taking into account a ratio between a stator leakage inductance and a rotor leakage inductance.

The method may include applying a d-axis current reference or a q-axis current reference after the calculating the stator transient inductance, wherein the d-axis current reference is expressed as follows:

$$i_{ds}^{s*} = \sqrt{2} I_m \cos(\omega_{si} t)$$

According to the above-described embodiments of the present disclosure, parameters of an induction machine can be more accurately estimated even in stationary state by utilizing voltage equations of the induction machine and signal processing techniques, with no additional hardware.

Accordingly, the method does not require an encoder, a resolver or sensors such as a hall sensor for locating the rotor of the induction machine. Therefore, the method can be applied to a variety of operation methods including constant air gap flux control, vector control and sensorless control.

DETAILED DESCRIPTION

The above objects, features and advantages will become apparent from the detailed description with reference to the accompanying drawings. Embodiments are described in sufficient detail to enable those skilled in the art in the art to easily practice the technical idea of the present disclosure. Detailed disclosures of well known functions or configurations may be omitted in order not to unnecessarily obscure the gist of the present disclosure.

Hereinafter, embodiments of the present disclosure will be described in detail with reference to the accompanying drawings. Throughout the drawings, like reference numerals refer to like elements.

Figure 1:
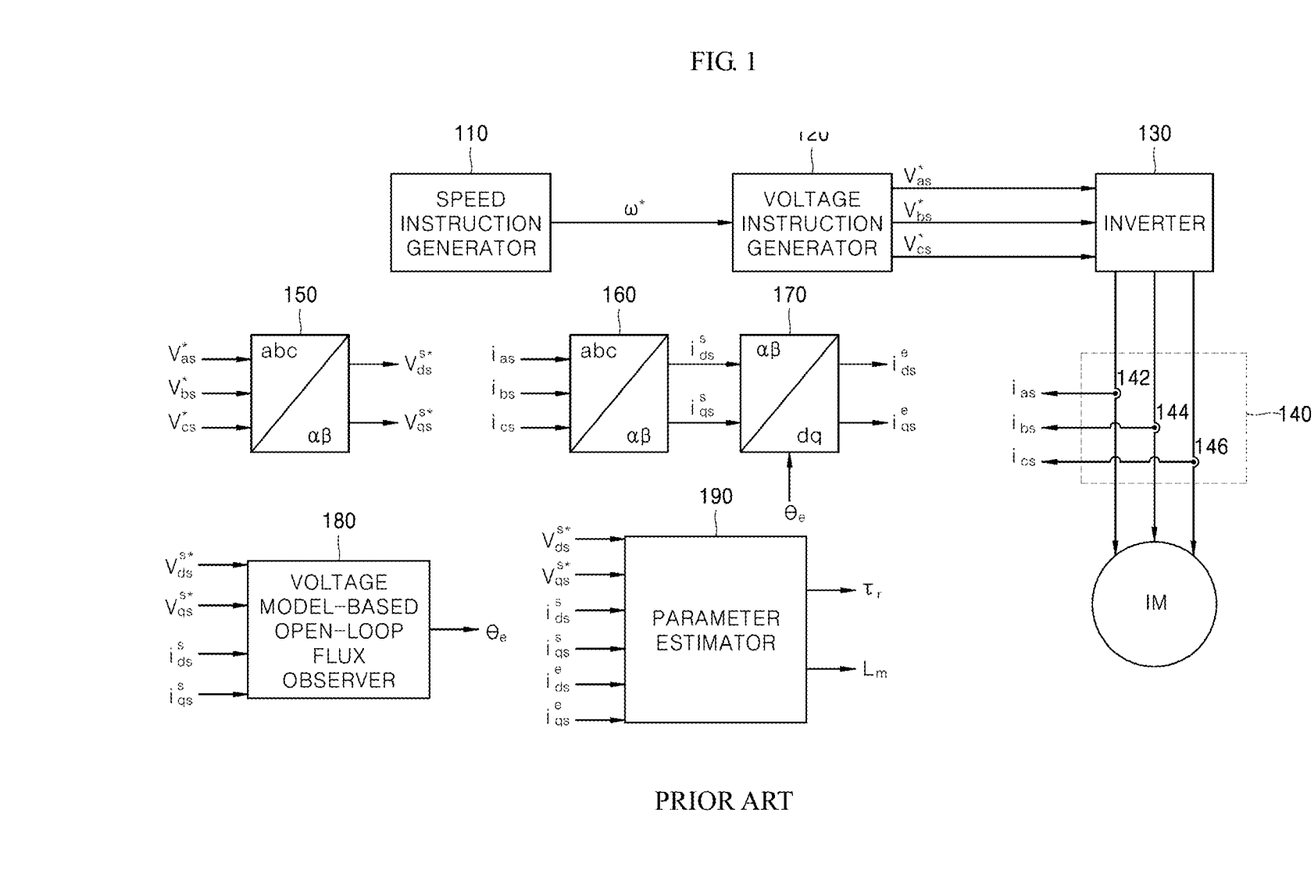
FIG. 1 is a diagram for conceptually illustrating a method for estimating parameters of an induction machine when it is rotational in the prior art.

FIG. 1 conceptually illustrates a method for estimating parameters of an induction machine when it is rotational in the related art. Specifically, FIG. 1 shows a method for estimating parameters of an induction machine while it is rotating by using a stator voltage and a stator current.

Firstly, functionality of each of the elements shown in FIG. 1 will be briefly described.

A speed instruction generator 110 determines the operation speed of an induction machine to cause the induction machine to be operated at a constant speed.

A voltage instruction generator 120 generates a three-phase voltage reference from the output from the speed instruction generator 110.

A phase-current measurer 140 measures a phase-current between an inverter 130 and an induction machine IM. One of the measurers 142, 144 and 146 each for respective three-phase currents may be omitted.

The voltage converter 150 converts the three-phase voltage from the voltage instruction generator 120 into voltages on the d-axis and the q-axis of the stationary reference frame.

A first current converter 160 converts the three-phase current from the phase-current measurer 140 into currents on the d-axis and the q-axis of the stationary reference frame.

A second current converter 170 converts outputs from the first current converter 160 and an open-loop flux observer 180 into currents on the d-axis and the q-axis of a synchronous reference frame.

The open-loop flux observer 180 calculates a rotor flux angle from outputs from the voltage converter 150 and the first current converter 160.

A parameter estimator 190 estimates a rotor time constant $\tau_r$ and mutual inductance $L_m$ of the induction machine from the outputs from the voltage converter 150, the first current converter 160 and the second current converter 170.

Hereinafter, the method for estimating parameters of an induction machine when it is rotational by using the above-described elements.

The method shown in FIG. 1 is carried out with the assumption that the stator resistance $R_s$ and the transient inductance $\sigma L_s$ are known.

That is, the stator and rotor voltage equations of an induction machine on a synchronous frame reference rotating at an angular velocity carried out in the open-loop flux observer 180 may be expressed in Equations below:

$$V_{ds}^{\omega} = R_s i_{ds}^{\omega} + p\lambda_{ds}^{\omega} - \omega\lambda_{qs}^{\omega} \qquad \text{[Equation 1]}$$

$$V_{qs}^{\omega} = R_s i_{qs}^{\omega} + p\lambda_{qs}^{\omega} + \omega\lambda_{ds}^{\omega} \qquad \text{[Equation 2]}$$

$$0 = R_r i_{dr}^{\omega} + p\lambda_{dr}^{\omega} - (\omega - \omega_r)\lambda_{qr}^{\omega} \qquad \text{[Equation 3]}$$

$$0 = R_r i_{qr}^{\omega} + p\lambda_{qr}^{\omega} + (\omega - \omega_r)\lambda_{dr}^{\omega} \qquad \text{[Equation 4]}$$

where R denotes stator resistance, and $\omega_r$ denotes rotor speed.

Magnetic flux equations of the stator and the rotor may be expressed as follows:

$$\lambda_{ds}^{\omega} = L_s i_{ds}^{\omega} + L_m i_{dr}^{\omega} \qquad \text{[Equation 5]}$$

$$\lambda_{qs}^{\omega} = L_s i_{qs}^{\omega} + L_m i_{qr}^{\omega} \qquad \text{[Equation 6]}$$

$$\lambda_{dr}^{\omega} = L_m i_{ds}^{\omega} + L_r i_{dr}^{\omega} \qquad \text{[Equation 7]}$$

$$\lambda_{qr}^{\omega} = L_m i_{qs}^{\omega} + L_r i_{qr}^{\omega} \qquad \text{[Equation 8]}$$

where $L_s$ denotes stator self inductance. In addition, $L_r$, denotes rotor self inductance, and $L_m$ denotes mutual inductance.

In Equations 1 and 2, the stator d-q flux on the stator reference frame may be expressed as follows:

$$\lambda_{ds}^{s}(t) = \int_0^t [V_{ds}^{s}(\tau) - R_s i_{ds}^{s}(\tau)]d\tau \qquad \text{[Equation 9]}$$

$$\lambda_{qs}^{s}(t) = \int_0^t [V_{qs}^{s}(\tau) - R_s i_{qs}^{s}(\tau)]d\tau \qquad \text{[Equation 10]}$$

The open-loop flux observer expressed in Equations 9 and 10 integrates merely voltage and current with no feedback component, and thus there may be divergence due to measurement offset or the like.

To avoid such a problem, a low pass filter (LPF) may be used instead of mere integration. Since the cut-off frequency of the LPF is known, variation in the phase and magnitude occurring in the LPF may be compensated appropriately.

Therefore, the rotor flux on the stationary reference frame may be derived as follows:

$$\lambda_{dr}^{s} = \frac{L_r}{L_m}(\lambda_{ds}^{s} - \sigma L_s i_{ds}^{s}) \qquad \text{[Equation 11]}$$

$$\lambda_{qr}^{s} = \frac{L_r}{L_m}(\lambda_{qs}^{s} - \sigma L_s i_{qs}^{s}) \qquad \text{[Equation 12]}$$

Further, the rotor flux angle ($\theta_e$) may be exposed as follows from the rotor flux:

$$\theta_e = \arctan\left(\frac{\lambda_{qr}^{s}}{\lambda_{dr}^{s}}\right) = \arctan\left(\frac{\lambda_{qs}^{s} - \sigma L_s i_{qs}^{s}}{\lambda_{ds}^{s} - \sigma L_s i_{ds}^{s}}\right) \qquad \text{[Equation 13]}$$

The parameter estimator 190 shown in FIG. 1 is to calculate a rotor time constant $\tau_r$ and magnetizing inductance $L_m$. An algorithm applied to the parameter estimator 190 may be implemented by using Equations as follows:

The induction machine is accelerated up to its rated speed so that the rotor flux angle can accurately estimated by the open-loop flux observer. If the rotor flux angle is correct, the flux of the rotor exists on the d-axis, and thus $\lambda_{qr}^{e}$ is 0 in principle. Accordingly, the following relationship is established according to Equation 8:

$$i_{qs}^{e} = -\frac{L_r}{L_m}i_{qr}^{e} \qquad \text{[Equation 14]}$$

The slip frequency of the induction machine may be expressed as in Equation 15 below:

$$\omega_e - \omega_r = -\frac{R_r i_{qr}^{e}}{\lambda_{dr}^{e}} = \frac{R_r}{\lambda_{dr}^{e}}\frac{L_m}{L_r}i_{qs}^{e} \qquad \text{[Equation 15]}$$

Once the operation of the induction machine reaches the steady state, it may be determined that the d-axis rotor flux ($\lambda_{dr}^e$) is constant. Accordingly, Equation 15 may be expressed as follows:

$$\omega_e - \omega_r = \frac{R_r}{\lambda_{dr}^e} \frac{L_m}{L_r} i_{qs}^e = \frac{R_r}{L_m i_{ds}^e} \frac{L_m}{L_r} i_{qs}^e = \frac{R_r}{L_r} \frac{i_{qs}^e}{i_{ds}^e} = \frac{1}{\tau_r} \frac{i_{qs}^e}{i_{ds}^e} \qquad \text{[Equation 16]}$$

As expressed in Equation 16, the rotor time constant can be calculated by the slip frequency and d-q current of the synchronous reference frame. However, in actual calculation, the rotor time constant cannot be accurately calculated because it is sensitive to measurement noise in current and the pulsing of the slip frequency appears.

In order to exclude such influence, an integration technique can be used. That is, by integrating Equation 16, the rotor time constant may be obtained as follows:

$$\tau_r = \frac{1}{[\theta_e(t_2) - \theta_e(t_1)] - [\theta_r(t_2) - \theta_r(t_1)]} \int_{t_1}^{t_2} \frac{i_{qs}^e}{i_{ds}^e} dt \qquad \text{[Equation 17]}$$

where [t1, t2] denotes an integration interval. The moving distances of the flux angle and the rotor angle during the integration interval are used in calculating the rotor time constant. The longer the integration interval is, the less measurement noise affects, such that estimation can become more accurate.

It is desired to estimate the magnetizing inductance when the rotor flux is equal to the rated flux value. Accordingly, the magnetic inductance is estimated when the operation speed of the induction machine is equal to the rated speed.

The magnitude of the rotor flux can be obtained from Equations 11 and 12. With the assumption that the rotor self inductance is substantially equal to the magnetizing inductance, the magnetizing inductance can be calculated as follows:

$$L_m = \frac{|\lambda_r^s|}{i_{ds}^e} = \frac{\sqrt{\lambda_{dr}^{s\,2} + \lambda_{qr}^{s\,2}}}{i_{ds}^e} \cong \frac{\sqrt{(\lambda_{ds}^s - \sigma L_s i_{ds}^s)^2 + (\lambda_{qs}^s - \sigma L_s i_{qs}^s)^2}}{i_{ds}^e} \qquad \text{[Equation 18]}$$

In order to reduce the influence of current measurement noise, a LPF may be used. Since values of the synchronize reference frame are DC (direct current) values, it is possible to remove noise only without time-delay.

Accordingly, in order to estimate the rotor time constant ($\tau_r$) and the magnetizing inductance ($L_m$), the parameter estimator 190 may be implemented by using Equations 17 and 18.

The method for estimating parameters of an induction machine described above is referenced from "*A simple induction motor parameter estimation method for vector control*" by Wook-Jin Lee, Young-Doo Yoon, Seung-Ki Sul, Yoon-Young Choi and Young-Seok Shim, in Conf. rec. on EPE2007, 2007.

However, the method in the related art has problems such as that it can estimate parameters only when the induction machine is operating near the rated speed.

In practice, an induction machine for driving an inverter may be unable to rotate due to system configuration, etc. In such a case, the existing method cannot be applied, and thus a novel method is required which can estimate parameters of an induction machine when it is stationary.

Figure 2:
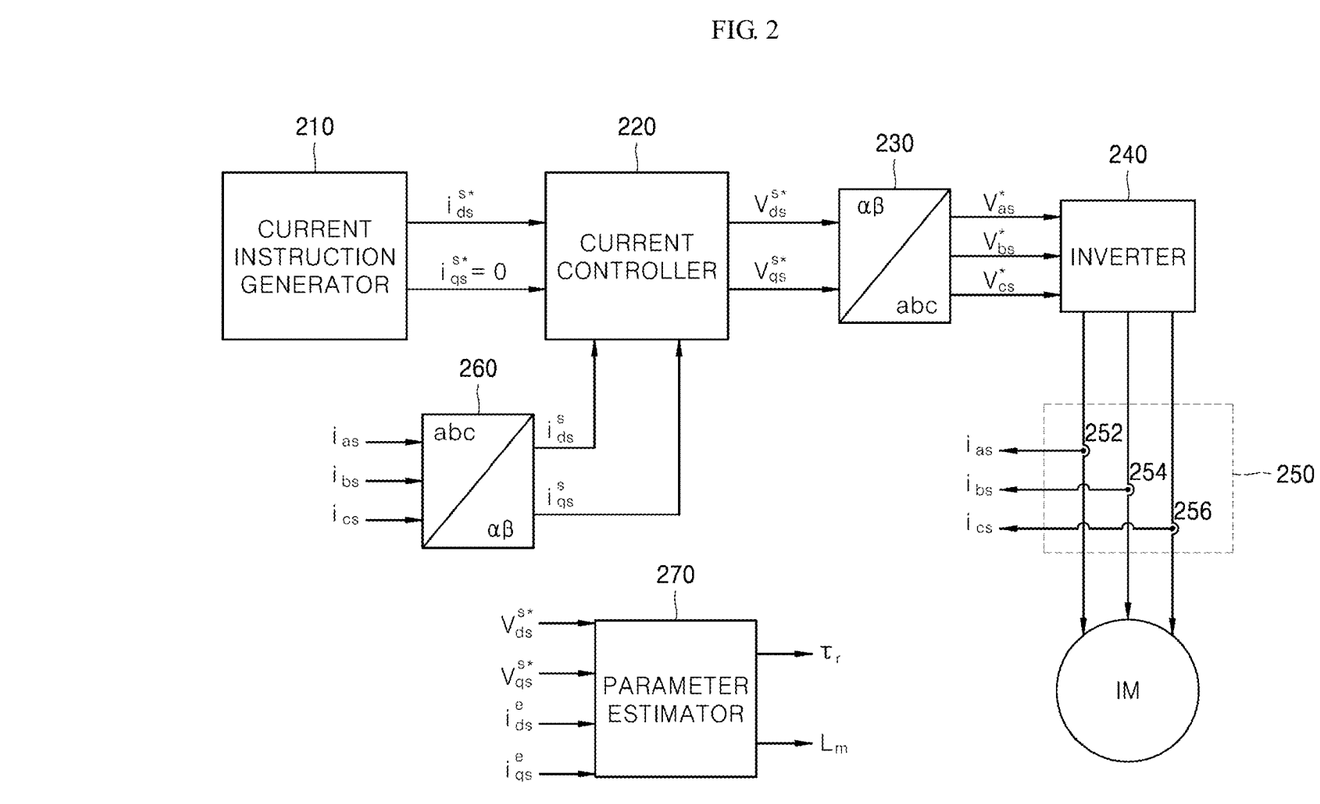
FIG. 2 is a diagram for conceptually illustrating a method for estimating parameters of an induction machine according to some embodiments of the present disclosure.

FIG. 2 is a diagram for conceptually illustrating a method for estimating parameters of an induction machine according to some embodiments of the present disclosure.

Firstly, functionality of each of the elements shown in FIG. 2 will be briefly described.

A current reference generator 210 generates the d-axis and q-axis current references on the stationary reference frame. The q-axis current reference outputs 0 (zero) so as to prevent the induction machine IM from generating torque to rotate. The d-axis current reference includes a constant value.

Figure 3:
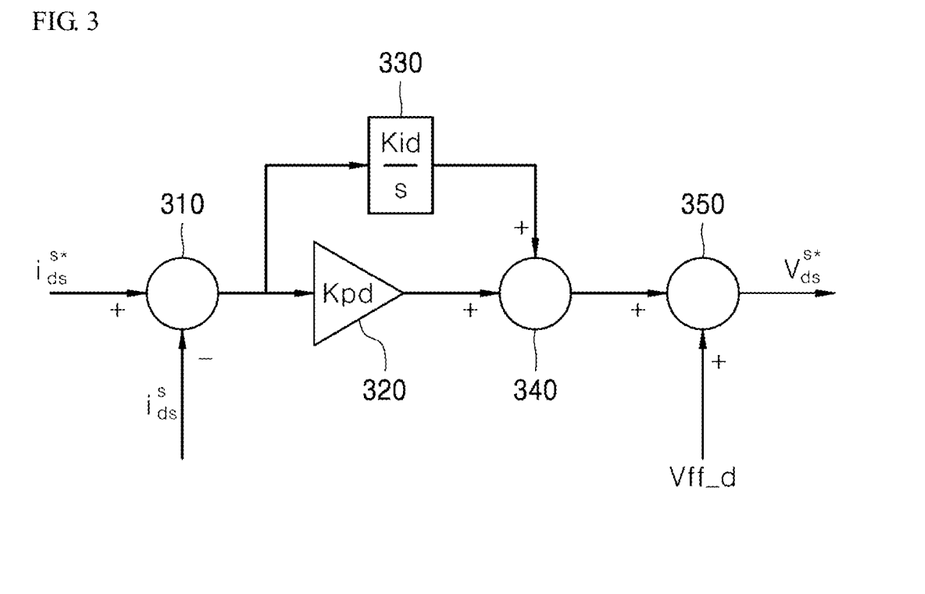
FIGS. 3 and 4 are diagrams for illustrating the configuration of the d-axis current controller and the configuration of the q-axis current controller shown in FIG. 2, respectively, according to some embodiments of the present disclosure.
Figure 4:
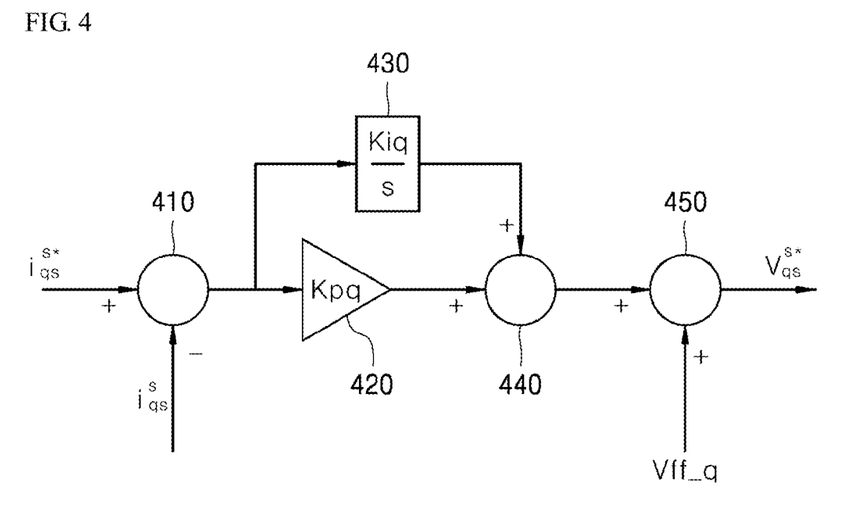

A current controller 220 controls an output current from the current reference generator 210. A typical proportional and integral (PI) current controller may be used as the current controller 220. The structure of the d-axis current controller of the current controller 220 is shown in FIG. 3, and the structure of the d-axis current controller of the current controller 220 is shown in FIG. 4.

A voltage reference converter 230 converts an output from the current controller 220 into a three-phase voltage reference.

The current converter 260 converts an induction machine phase-current measured by the phase-current measurer 250 into currents on the stationary reference frame, which are feedback currents input to the current controller 220.

In addition, a voltage source inverter 240 and a parameter estimator 270 are also shown in FIG. 2.

Hereinafter, the method for estimating parameters of an induction machine by the elements will be described in detail. The configuration of the d-axis current controller and the configuration of the q-axis current controller of the current controller 220 will be described briefly with reference to FIGS. 3 and 4.

An element 310 shown in FIG. 3 obtains an error between the d-axis current reference of the current reference generator 210 and the feedback d-axis current to the current convert 260.

An element 320 multiplies the error calculated by the element 310 by a proportional gain. An element 330 performs integration.

An element 340 performs summation of outputs from the elements 320 and 330.

An element 350 performs summation of feedforward terms.

An element 410 shown in FIG. 4 obtains an error between the q-axis current reference of the current reference generator 210 and the feedback q-axis current to the current convert 260.

An element 420 multiplies the error calculated by the element 410 by a proportional gain. An element 430 performs integration.

An element 440 performs summation of outputs from the elements 420 and 430.

An element 450 performs summation of feedforward terms.

Hereinafter, procedures of estimating parameters of an induction machine when it is stationary by using the above-described elements will be described in detail. Specifically, an algorithm for implementing the parameter estimator 270 applied to the method for estimating parameters of the induction machine according to some embodiments of the present disclosure will be described by using Equations below.

Referring to an electric model of an induction machine when it is stationary, the following voltage and flux Equations can be expressed.

It is to be noted that noted that current has to be applied to only one direction of the stationary reference frame in order to prevent the induction machine from rotating. In this example, current is applied to the d-axis, that Equations are associated with the d-axis. It is to be understood that current material applied to other directions on the stationary reference frame.

$$V_{ds}^s = R_s i_{ds}^s + S\lambda_{ds}^s \quad \text{[Equation 19]}$$

$$0 = R_r i_{dr}^s + S\lambda_{dr}^s \quad \text{[Equation 20]}$$

$$\lambda_{ds}^s = L_s i_{ds}^s + L_m i_{dr}^s \quad \text{[Equation 21]}$$

$$\lambda_{ds}^s = L_m i_{ds}^s + L_r i_{dr}^s \quad \text{[Equation 22]}$$

By combining Equation 21 with Equation 22, the stator flux can be expressed as follows:

$$\lambda_{ds}^s = \sigma L_s i_{ds}^s + \frac{L_m}{L_r} \lambda_{dr}^s \quad \text{[Equation 23]}$$

In addition, by combining Equation 20 with Equation 22, the rotor flux can be expressed as the stator current as follows:

$$\lambda_{dr}^s = \frac{R_r/L_r}{s + R_r/L_r} L_m i_{ds}^s \quad \text{[Equation 24]}$$

Subsequently, by substituting Equation 23 into Equation 19, the stator voltage can be expressed as follows:

$$V_{ds}^s = R_s i_{ds}^s + s\sigma L_s i_{ds}^s + s\frac{L_m}{L_r}\lambda_{dr}^s \quad \text{[Equation 25]}$$

In addition, by substituting Equation 24 into Equation 25, the stator voltage can be expressed as follows:

$$V_{ds}^s = R_s i_{ds}^s + s\sigma L_s i_{ds}^s + \frac{s}{s + R_r/L_r}\frac{L_m^2}{L_r^2} R_r i_{ds}^s \quad \text{[Equation 26]}$$

Equation 26 is expressed only with the d-axis voltage and current of the stator on the stationary reference frame, and thus it is appropriate to estimate parameters of the induction machine when it is stationary. By applying DC current to Equation 26, Equation 26 may be expressed simply as follows:

$$V_{ds}^s = R_s i_{ds}^s \quad \text{[Equation 27]}$$

Accordingly, the stator resistance can be calculated as Equation 28 below:

$$R_s = \frac{V_{ds}^s}{i_{ds}^s} \quad \text{[Equation 28]}$$

In practice, there are other factors such as non-linearity of an inverter, conduction resistances of a semiconductor switching and a diode. Accordingly, the accuracy of the method expressed in Equation 28 can be increased by measuring several currents to calculate the slope and calculating the stator resistance by using the slope. This may be expressed by Equation 29 below:

$$R_s = \frac{v_{ds1}^s - v_{ds2}^s}{i_{ds1}^s - i_{ds2}^s} \quad \text{[Equation 29]}$$

where the numerals 1 and 2 denote different measurement points.

By applying the stator voltage ($V_{ds}^s$) in the form of short pulses to Equation 26, Equation 26 may be expressed simply as follows:

$$v_{ds}^s = \left(R_s + \frac{L_m^2}{L_r^2} R_r\right) i_{ds}^s + s\sigma L_s i_{ds}^s \quad \text{[Equation 30]}$$

If the value of $V_{ds}^s$ is sufficiently large, the voltage drop component across the resistor can be ignored. Accordingly, the stator transient inductance may be estimated as follows:

$$\sigma L_s = \frac{v_{ds}^s}{\Delta i_{ds}^s} \Delta T \quad \text{[Equation 31]}$$

where $\Delta T$ denotes time period of applying pulses, $\Delta i_{ds}^s$ denotes the slope of current according to applied voltage.

The ways of estimating the stator resistance and the transient inductance by using Equations 28 and 31 are the same as in the related art. Accordingly, it can be seen that Equation 26 is valid from DC current to high frequency.

The rotor time constant and the magnetizing inductance may be estimated by using Equation 26.

That is, by defining $$\frac{L_m^2}{L_r^2} R_r$$

as, $R_r'$ we have:

$$v_{ds}^s = R_s i_{ds}^s + s\sigma L_s i_{ds}^s + \frac{1}{s + R_r/L_r} R_r' s i_{ds}^s \quad \text{[Equation 32]}$$

$$\left(R_r' \equiv \frac{L_m^2}{L_r^2} R_r\right)$$

By moving the first and second terms on the right side of Equation 32 to the left side, we have:

$$v_{ds}^s - R_s i_{ds}^s - s\sigma L_s i_{ds}^s = \frac{1}{s + R_r/L_r} R_r' s i_{ds}^s \quad \text{[Equation 33]}$$

The tem $V_{ds}^s$ on the left side may be known from the output value from the current controller. The terms $R_s i_{ds}^s + s\sigma L_s i_{ds}^s$ of Equation 32 may be calculated by using the current value, the stator resistance and the transient inductance value. In this manner, all terms on the left side are calculated. Let us define it as X.

The value of $si_{ds}^s$ also can be calculated. Let us define it as Y. Then, Equation 33 may be expressed simply as follows:

$$X = \frac{1}{s + 1/\tau_r} R'_r Y \quad \text{[Equation 34]}$$

$$(X \equiv v^s_{ds} - R_s i^s_{ds} - s\sigma L_s i^s_{ds},\ Y \equiv s i^s_{ds})$$

Equation 34 is expressed with X and Y signals whose values are known, $\tau_r$ and $R'_r$.

Accordingly, $\tau_r$ and $R'_r$ can be calculated by using the X and Y signals.

However, if calculation is carried out by using the X and Y signals every instance, it is difficult to accurately estimate parameters due to measurement noise and noise in output voltage from the current controller.

To overcome such a problem, integration technique is utilized to allow for estimation that is robust to noise and includes high repeatability.

By deploying Equation 34, we have:

$$Y = \frac{1}{R'_r} sX + \frac{1}{R'_r \tau_r} X \quad \text{[Equation 35]}$$

$$(X \equiv v^s_{ds} - R_s i^s_{ds} - s\sigma L_s i^s_{ds},\ Y \equiv s i^s_{ds})$$

By replacing the coefficients to simplify the equation, we have:

$$Y = a \cdot sX + b \cdot X \quad \text{[Equation 36]}$$

$$\left(a \equiv \frac{1}{R'_r},\ b \equiv \frac{1}{R'_r \tau_r}\right)$$

By multiplying Equation 36 by Y and integrating it, we have:

$$\int_{T_0}^{T_f} Y \cdot Y dt = a \int_{T_0}^{T_f} \frac{dX}{d\tau} \cdot Y dt + b \int_{T_0}^{T_f} X \cdot Y dt \quad \text{[Equation 37]}$$

$$= a\left([X \cdot Y]_{T_0}^{T_f} - \int_{T_0}^{T_f} X \cdot \frac{dY}{d\tau} dt\right) + b \int_{T_0}^{T_f} X \cdot Y dt$$

By multiplying Equation 36 by $\int_{T_0}^{\tau} Y d\tau$ and integrating it, we have:

$$\int_{T_0}^{T_f}\left[Y \cdot \int_{T_0}^{\tau} Y d\tau\right] dt = a \int_{T_0}^{T_f}\left[\frac{dX}{d\tau} \cdot \int_{T_0}^{\tau} Y d\tau\right] dt + \quad \text{[Equation 38]}$$

$$b \int_{T_0}^{T_f}\left[X \cdot \int_{T_0}^{\tau} Y d\tau\right] dt$$

$$= a\left(\left[X \cdot \int_{T_0}^{\tau} Y d\tau\right]_{T_0}^{T_f} - \int_{T_0}^{T_f} X \cdot Y dt\right) +$$

$$b \int_{T_0}^{T_f}\left[X \cdot \int_{T_0}^{\tau} Y d\tau\right] dt$$

By setting the integration interval [T0, Tf] so that $\int_{T_0}^{\tau} Y d\tau$ becomes 0, Equations 37 and 38 may be simplified as follows:

$$\int_{T_0}^{T_f} Y \cdot Y dt = -a \int_{T_0}^{T_f} X \cdot \frac{dY}{d\tau} dt + b \int_{T_0}^{T_f} X \cdot Y dt \quad \text{[Equation 39]}$$

$$\left(\because [X \cdot Y]_{T_0}^{T_f} = 0\right)$$

$$\int_{T_0}^{T_f}\left[Y \cdot \int_{T_0}^{\tau} Y d\tau\right] dt = \quad \text{[Equation 40]}$$

$$-a \int_{T_0}^{T_f} X \cdot Y dt + b \int_{T_0}^{T_f}\left[X \cdot \int_{T_0}^{\tau} Y d\tau\right] dt$$

$$\left(\because \left[X \cdot \int_{T_0}^{\tau} Y d\tau\right]_{T_0}^{T_f} = 0\right)$$

By simplifying Equations 39 and 40 once again, we Equations 41 and 42 below:

$$\int_{T_0}^{T_f} Y \cdot Y dt = \quad \text{[Equation 41]}$$

$$-a \int_{T_0}^{T_f} X \cdot \frac{dY}{d\tau} dt + b \int_{T_0}^{T_f} X \cdot Y dt \Leftrightarrow A = -a \cdot B + b \cdot C$$

$$\int_{T_0}^{T_f}\left[Y \cdot \int_{T_0}^{\tau} Y d\tau\right] dt = \quad \text{[Equation 42]}$$

$$-a \int_{T_0}^{T_f} X \cdot Y dt + b \int_{T_0}^{T_f}\left[X \cdot \int_{T_0}^{\tau} Y d\tau\right] dt \Leftrightarrow D =$$

$$-a \cdot C + b \cdot E$$

In Equations 41 and 42, the values of A, B, C and E increase with the integration interval. If $\int_{T_0}^{\tau} Y d\tau$ is set to 0, the value of D is equal to 0 mathematically, but is close to 0 in practice. Accordingly, the longer the integration interval is, the less measurement noise affects.

Once the values of A, B, C, D and E are calculated, we can include the value of a and b from the simultaneous linear equations with two unknowns as follows:

$$a = \frac{AE - CD}{C^2 - BE} \quad \text{[Equation 43]}$$

$$b = \frac{AC - BD}{C^2 - BE} \quad \text{[Equation 44]}$$

In Equation 36, a and b are defined as follows:

$$a \equiv \frac{1}{R'_r} \quad \text{[Equation 45]}$$

$$b \equiv \frac{1}{R'_r \tau_r} \quad \text{[Equation 46]}$$

That is, by using the values of a and b obtained from Equations 43 and 44, the rotor time constant, the stator self inductance and the magnetizing inductance may be calculated as follows. It is assumed that the stator leakage inductance and the rotor leakage inductance are the half of the stator transient inductance ($L_{ls} = L_{lr} = \sigma L_s/2$). This assumption may vary depending on the characteristics of the induction machine. This is because the ratio between the stator leakage inductance and the rotor leakage inductance varies depending on the type of the induction machine as classified by NEMA.

For example, in an induction machine of type-A or type-B, the ratio between the stator leakage inductance and the rotor leakage inductance is 5:5. In an induction machine of type-C, the ratio between the stator leakage inductance and the rotor leakage inductance is 4:6. In an induction machine of type-C, the ratio between the stator leakage inductance and the rotor leakage inductance is 3:7.

$$\tau_r = \frac{a}{b} \quad \text{[Equation 47]}$$

$$\frac{L_m^2}{L_r} = R'_r \tau_r = \frac{1}{b} \quad \text{[Equation 48]}$$

$$L_s = \delta L_s + \frac{L_m^2}{L_r} = \delta L_s + \frac{1}{b} \quad \text{[Equation 49]}$$

$$L_m = L_s - \frac{\delta L_s}{2} = \frac{1}{b} + \frac{\delta L_s}{2} \quad \text{[Equation 50]}$$

As described above, the parameter estimator 270 shown in FIG. 2 is implemented by using Equations 41 to 50. That is, we can calculate A, B, C, D and E expressed by Equations 41 and 42, and then calculate the values of a and b by using Equations 43 and 44. Then, we can calculate the rotor time constant ($\tau_r$) and the magnetizing inductance ($L_m$) by using Equations 47 to 50 when it is stationary.

The current applied for estimating parameters may be expressed as Equation 51 below:

$$i_{ds}^s = \sqrt{2} I_m \cos(\omega_{si} t) \quad \text{[Equation 51]}$$

Figure 5:
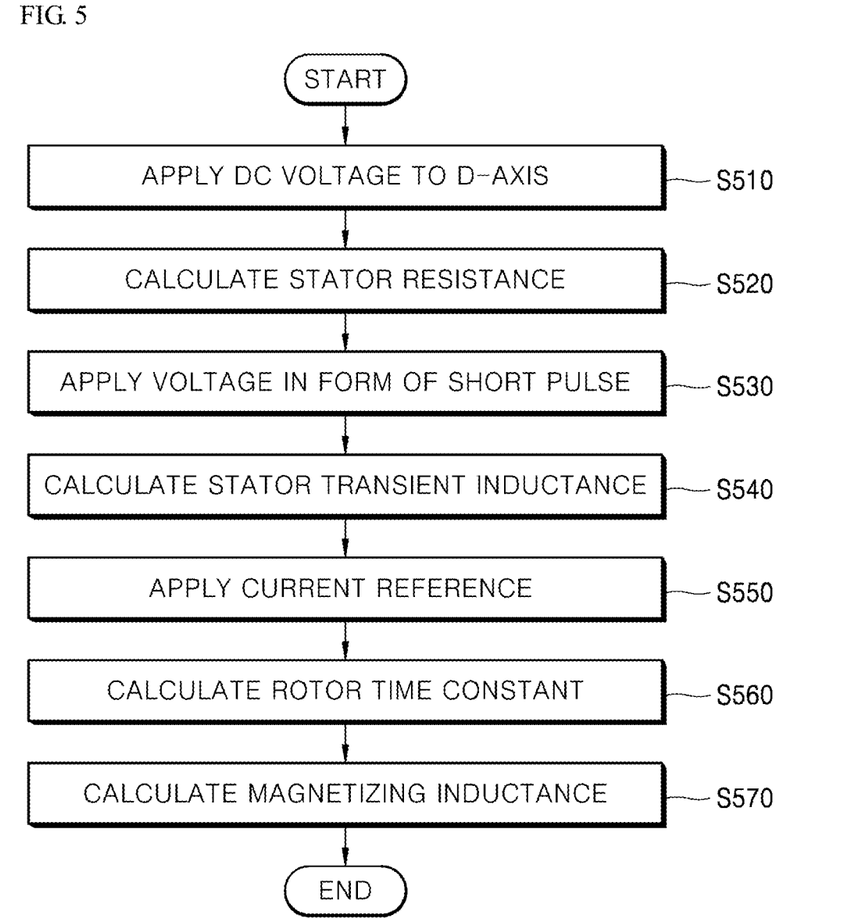
FIG. 5 is a flowchart for illustrating a method for estimating parameters of an induction machine according to some embodiments of the present disclosure.

FIG. 5 is a flowchart for illustrating a method for estimating parameters of an induction machine according to some embodiments of the present disclosure.

Referring to FIG. 5, a method for estimating parameters of an induction machine according to some embodiments of the present disclosure may include applying DC voltage to a d-axis (S510), calculating a stator resistance (S520), applying voltage in the form of short pulses to the d-axis (S530), calculating a stator transient inductance (S540), applying current reference (S550), calculating a rotor time constant (S560), and calculating a magnetizing inductance (S570).

Step S510 was described above with respect to Equations 26 and 27. Step S520 was described above with respect to Equations 28 and 29.

In addition, Step S530 was described above with respect to Equation 30. Step S540 was described above with respect to Equation 31. Steps S560 and S570 were described above with respect to Equations 47 to 59. Step S550 was described above with Equation 51.

In the foregoing description, it is assumed that current is supplied to the d-axis on the stationary reference frame for convenience of illustration, and Equations associated with the d-axis have been described. As mentioned earlier, however, it is to be understood that current may be supplied to other directions on the stationary reference frame.

According to the above-described embodiments of the present disclosure, parameters of an induction machine can be more accurately estimated even when it is stationary by utilizing voltage equations of the induction machine and signal processing techniques, with no additional hardware.

Accordingly, the method does not require an encoder, a resolver or sensors such as a hall sensor for locating the rotor of the induction machine. Therefore, the method can be applied to a variety of operation methods including constant air gap flux control, vector control and sensorless control.

The embodiments of the present disclosure described above may be substituted, altered, and modified by those skilled in the art without departing from the scope and sprit of the present disclosure. Therefore, the present disclosure is not limited to the above-mentioned embodiments and the accompanying drawings. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for estimating parameters of an induction machine when the machine is stationary, the method comprising:
   applying a Direct Current (DC) current to one direction on a stationary reference frame to obtain a stator voltage from a stator flux and a rotor flux obtained from an electric model of the induction machine when it is stationary;
   calculating a stator resistance based on at least the obtained stator voltage;
   calculating a stator transient inductance by applying the obtained stator voltage in a form of short pulse; and
   calculating parameters of the induction machine, including a rotor time constant and a magnetizing inductance, based on at least the calculated stator resistance and the calculated stator transient inductance.

2. The method of claim 1, wherein calculating the stator resistance comprises calculating the stator resistance based on at least a slope between two or more current values measured, and conduction resistances of a semiconductor switch and a diode, and
   wherein the slope takes into account a non-linearity of an inverter.

3. The method of claim 2, further comprising:
   applying a d-axis current reference or a q-axis current reference after calculating the stator transient inductance, wherein the d-axis current reference is expressed as follows:

$$i_{ds}^s = \sqrt{2} I_m \cos(\omega_{si} t).$$

4. The method of claim 1, wherein calculating parameters comprises calculating the rotor time constant and the magnetizing inductance by using an integration method.

5. The method of claim 4, wherein calculating parameters comprises calculating the magnetizing inductance based on at least a ratio between a stator leakage inductance and a rotor leakage inductance.

6. The method of claim 5, comprising:
   applying a d-axis current reference or a q-axis current reference after calculating the stator transient inductance, wherein the d-axis current reference is expressed as follows:

$$i_{ds}^s = \sqrt{2} I_m \cos(\omega_{si} t).$$

7. The method of claim 4, comprising:
applying a d-axis current reference or a q-axis current reference after calculating the stator transient inductance, wherein the d-axis current reference is expressed as follows:

$$i_{ds}^{s} = \sqrt{2} l_m \cos(\omega_{si} t).$$

8. The method of claim 1, further comprising:
applying a d-axis current reference or a q-axis current reference after calculating the stator transient inductance, wherein the d-axis current reference is expressed as follows:

$$i_{ds}^{s} = \sqrt{2} l_m \cos(\omega_{si} t).$$

* * * * *